us009357157B2

(12) United States Patent
Wada et al.

(10) Patent No.: US 9,357,157 B2
(45) Date of Patent: May 31, 2016

(54) VIDEO TRANSFERRING SYSTEM, VIDEO TRANSMISSION APPARATUS, VIDEO RECEPTION APPARATUS AND VIDEO TRANSFERRING METHOD

(75) Inventors: Sunao Wada, Kanagawa-ken (JP); Yasuo Ohya, Tokyo (JP); Shunichi Gondo, Tokyo (JP)

(73) Assignee: Toshiba Corporation, Tokyo (JP)

( * ) Notice: Subject to any disclaimer, the term of this patent is extended or adjusted under 35 U.S.C. 154(b) by 0 days.

(21) Appl. No.: 13/278,715

(22) Filed: Oct. 21, 2011

(65) Prior Publication Data
US 2012/0099831 A1 Apr. 26, 2012

(30) Foreign Application Priority Data
Oct. 26, 2010 (JP) .................................. 2010-240010

(51) Int. Cl.
*H04N 5/77* (2006.01)
*H04N 5/765* (2006.01)

(52) U.S. Cl.
CPC . *H04N 5/77* (2013.01); *H04N 5/765* (2013.01)

(58) Field of Classification Search
None
See application file for complete search history.

(56) References Cited

U.S. PATENT DOCUMENTS

| 6,496,980 | B1 * | 12/2002 | Tillman et al. ................. 725/90 |
| 6,510,553 | B1 * | 1/2003 | Hazra ............................. 725/87 |
| 2003/0208771 | A1 * | 11/2003 | Hensgen et al. .............. 725/100 |
| 2007/0230566 | A1 * | 10/2007 | Eleftheriadis .......... H04N 19/30 375/240.1 |
| 2009/0122878 | A1 * | 5/2009 | Liu et al. .................. 375/240.26 |
| 2010/0027678 | A1 * | 2/2010 | Alfonso .................... 375/240.21 |
| 2011/0052140 | A1 * | 3/2011 | Mori ...................... H04N 5/772 386/224 |
| 2011/0075758 | A1 * | 3/2011 | Nam .................... H04B 7/0617 375/295 |

FOREIGN PATENT DOCUMENTS

| JP | 2006-033507 | 2/2006 |
| JP | 2008-199677 | 8/2008 |

* cited by examiner

Primary Examiner — Hung Dang
Assistant Examiner — Sunghyoun Park
(74) Attorney, Agent, or Firm — Baker Botts L.L.P.

(57) ABSTRACT

In a transmission side, a layer adjusting unit performs an adjustment to store a scalable encoded video data in a memory, select and output a scalable data of a base quality as a real-time video, read from a memory a scalable data of an enhancement quality based on the designation of a enhancement quality and a transmission period of time, and output the scalable data of an enhancement quality together with a real-time scalable data. In the receiving side, a layer synthesizing unit synthesizes and outputs a real-time video at normal times, and lowers the real-time video to a quality of the base layer if there is an enhancement quality video of a designated period of time, thereby reading the base quality layer data corresponding to the designated video from the memory (153) and synthesizing the data with the enhancement quality video to output the resulting data.

13 Claims, 5 Drawing Sheets

VIDEO TRANSFERRING SYSTEM, VIDEO TRANSMISSION APPARATUS, VIDEO RECEPTION APPARATUS AND VIDEO TRANSFERRING METHOD

CROSS-REFERENCE TO RELATED APPLICATIONS

This application is based upon and claims the benefit of priority from Japanese Patent Applications No. 2010-240010, filed on Oct. 26, 2010, the entire contents of which are incorporated herein by reference.

TECHNICAL FIELD

The present disclosure relates to a video transferring system, a video transmission processing apparatus and reception processing apparatus thereof, and an video transferring method for transferring an video stream of, for example, a surveillance camera.

BACKGROUND

A conventional video transmission system transfers an video stream taken by a surveillance camera to a reception apparatus through a network while recording the video stream in a transmission apparatus during a predetermined period of time, and displays the video stream on a monitor of the reception apparatus in real time. When there is something to focus on in the video stream displayed on the monitor in real time, a user may perform rewind and playback operations.

Recently, the performance of a surveillance camera has continuously been enhanced and accordingly it has become possible to have high quality videos (particularly, resolution). Since such high quality videos have a great amount of data, it has been suggested that a lower quality video data be transferred at normal times and a high quality video data be provided only when a user requests playback.

However, since a bandwidth is highly occupied while a high quality video is supplied, it is very difficult to transfer a low quality video to be displayed in real time with the high quality video.

Additionally, it has been known that a video stream is transmitted as a scalable encoded data.

DETAILED DESCRIPTION

Hereinafter, embodiments of the present disclosure will now be described in detail with reference to the drawings.

Figure 1:
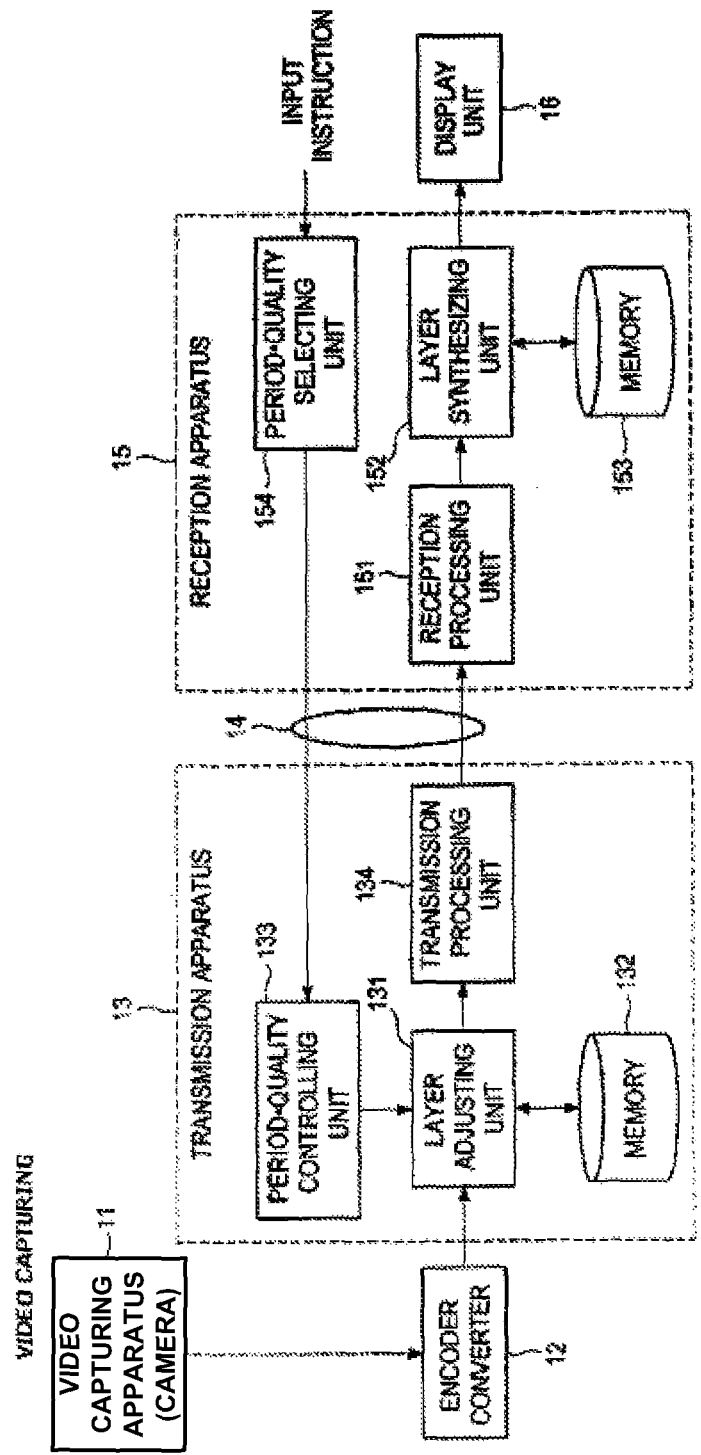
FIG. 1 is a block diagram showing a configuration of a video transferring system according to an embodiment of the present disclosure.

FIG. 1 is a block diagram showing a configuration of a video transferring system according to an embodiment. It is assumed herein that the system is a surveillance system that requires a real-time display.

In FIG. 1, a video capturing apparatus 11 denotes capturing apparatus such as a surveillance camera. The video stream taken by the video capturing apparatus 11 is scalable-encoded by an encoder 12 to thereby be sent to a transmission apparatus 13.

Figure 2:
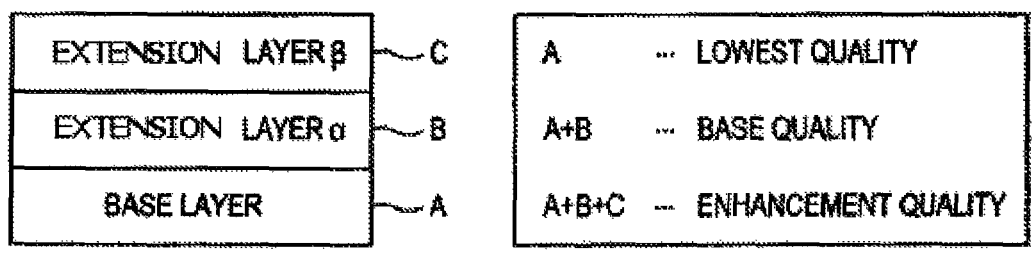
FIG. 2 is a conceptual view showing a layer configuration of transferred video data according to the embodiment.

The scalable encoding process of the encoder 12 encodes video data according to, for example, an H.264/SVC format. In the scalable encoding process, as shown in FIG. 2, the transmission videos are divided into three layers of a lowest quality, a base quality and an enhancement quality. The encoded data of a lowest quality video is provided in a base layer A, the encoded data of a differential video of a lowest quality video and a base quality video are provided in an extension layer ($\alpha$) B, and encoded data of a differential video of an enhancement quality video and a base quality video are provided in an extension layer ($\beta$) C.

In the transmission apparatus 13, video data which has been layer-encoded in the encoder 12 is input to a layer adjusting unit 131. The layer adjusting unit 131 stores the input video data in a memory 132, and, at the same time, selects and outputs encoded data of the base quality video, that is, encoded data of the base layer A and the extension layer ($\alpha$) B. In addition, based on a designated period of time and enhancement quality by a period and quality controlling unit 133, the layer adjusting unit 131 reads from the memory 132 the encoded data of the extension layer ($\beta$) C corresponding to the designated period of time, and outputs the data together with a real-time video encoded data. At this time, the real-time video encoded data for transmission is limited to only the base layer A, so that the entire bandwidth may be in its allowable range.

The video encoded data output from the layer adjusting unit 131 is sent to a transmission processing unit 134, layer-multiplexed in a predetermined datastream format to be transmitted from the transmission apparatus 13, and sent to a reception apparatus 15 through a network 14.

In the reception apparatus 15, the video encoded data transmitted from the network 14 is received by a reception processing unit 151 and is divided into each layer thereby being sent to a layer synthesizing unit 152. The layer synthesizing unit 152 distinguishes the transmitted data for each layer and stores the data in a memory 153 and, at the same time, layer-synthesizes a layer for each video and sends the layer-synthesized video to a display unit 16. The display unit 16 decodes the video encoded data and outputs the decoded data. If the display unit 16 received the encoded video data of the designated period of time, the display unit 16 decodes the video encoded data of the designated period and displays the decoded video together with the real-time video data (the video may be displayed in each of separate screens).

The reception apparatus 15 includes a period and quality selecting unit 154. in the case where a user requests a rewind replay with the enhancement quality video when monitoring a displayed video, the request is transmitted to the period and quality controlling unit 133 in the transmission apparatus 13 through the network 14 from the period and quality selecting unit 154.

In the above, the embodiment where a user inputs a request for a rewind replay with an enhancement quality video has been described. However, in the case where something abnormal condition is detected by motion detection, sound detection, face recognition and so on, it may trigger an automatic request for the enhancement quality video corresponding to the detected abnormal condition.

Figure 3A:
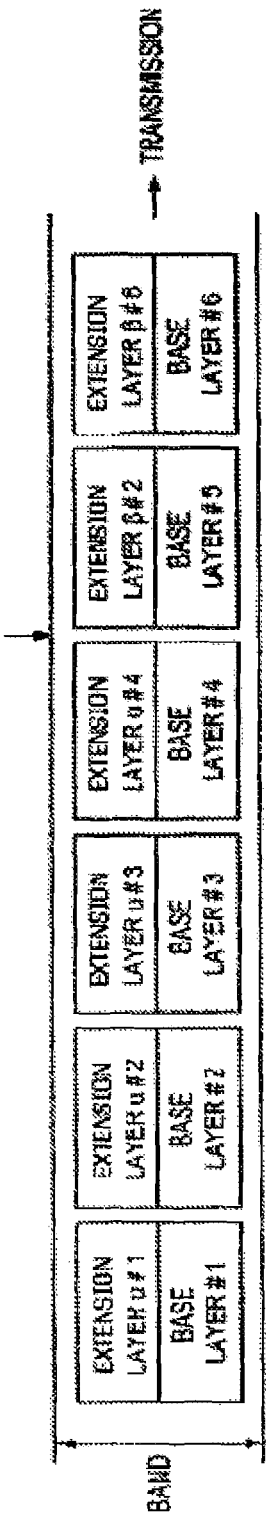
FIG. 3A is a conceptual view showing a band distribution of the scalable transmission according to the embodiment.
Figure 3B:
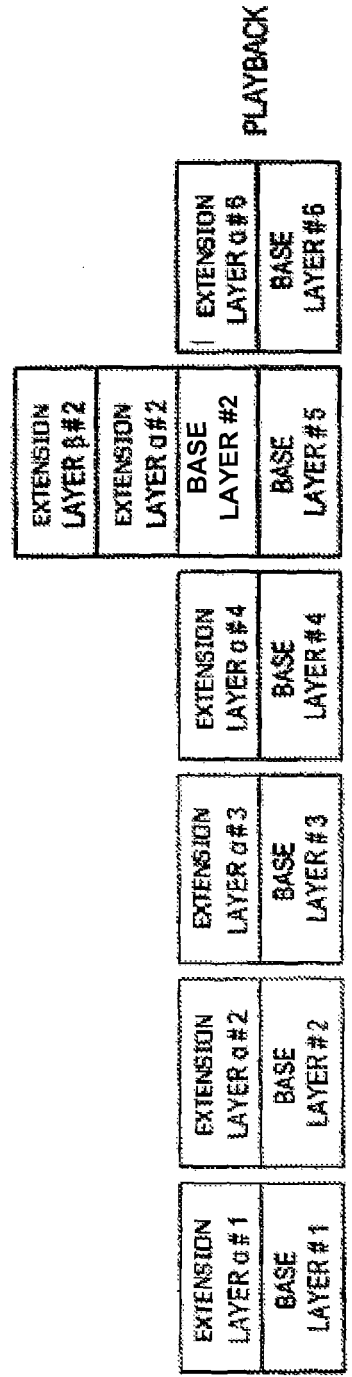
FIG. 3B is a conceptual view showing a band distribution of playback according to the embodiment.

FIG. 3A is a conceptual view showing an aspect of transmitting a rewind replay video together with a real-time video in the transmission apparatus 13, and FIG. 3B is a conceptual view showing an aspect of the playback display in the reception apparatus 15 according to the embodiment. First, as shown in FIG. 3A, at normal times, the transmission apparatus 13 transmits real-time video encoded data of a base quality through the base layer A and the extension layer (α) B (video encoded data of the base layer A and differential video encoded data of the extension layer (α) B) #1, #2, . . . in a bandwidth. This data is stored in the memory 153 for a predetermined period of time.

It is assumed herein that the rewind replay for the video encoded data #2 of the enhancement quality has been requested at the time of t. The transmission apparatus 13 reads the differential video encoded data #2 of the enhancement quality from the memory 132 when receiving a request for a rewind replay of the video encoded data #2 from the reception apparatus 15. At this time, the layer adjusting unit 131 stops transmitting the extension layer (α) B of the video encoded data #5 in real time, and transmits the differential video encoding data #2 of the enhancement quality having been read from the memory 132 in the corresponding bandwidth together with the video encoded data #5 of the lowest quality (i.e., base layer A of the video encoded data #5).

The layer synthesizing unit 152 in the reception apparatus 15 outputs the real-time transmitted video data #5 of the lowest quality to the display unit 16 and synthesizes the differential video encoded data of the extension layer (β) C transmitted during the period of time with the past video encoded data (the video encoded data of the base layer A and the differential video encoded data of the extension layer (α) B) which is read from the memory 153 to generate the video encoded data #2 of the enhancement quality and output it to the display unit 16. Accordingly, the real-time transmitted video is continuously displayed in the lowest quality without stopping, while a video of rewind replay is displayed in an enhancement quality.

The embodiment has been described for the video transferring system which transmits the encoded video stream of one channel. A video transferring system of the present disclosure may have a plurality of surveillance cameras and transmit encoded video streams of multiple channels.

Figure 4A:
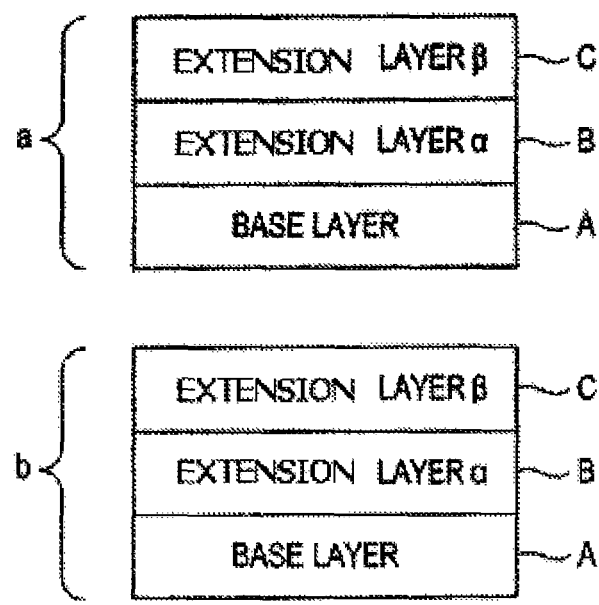
FIG. 4A is a conceptual view showing a layer configuration in the case where a plurality of video streams are transferred according to the embodiment.
Figure 4B:
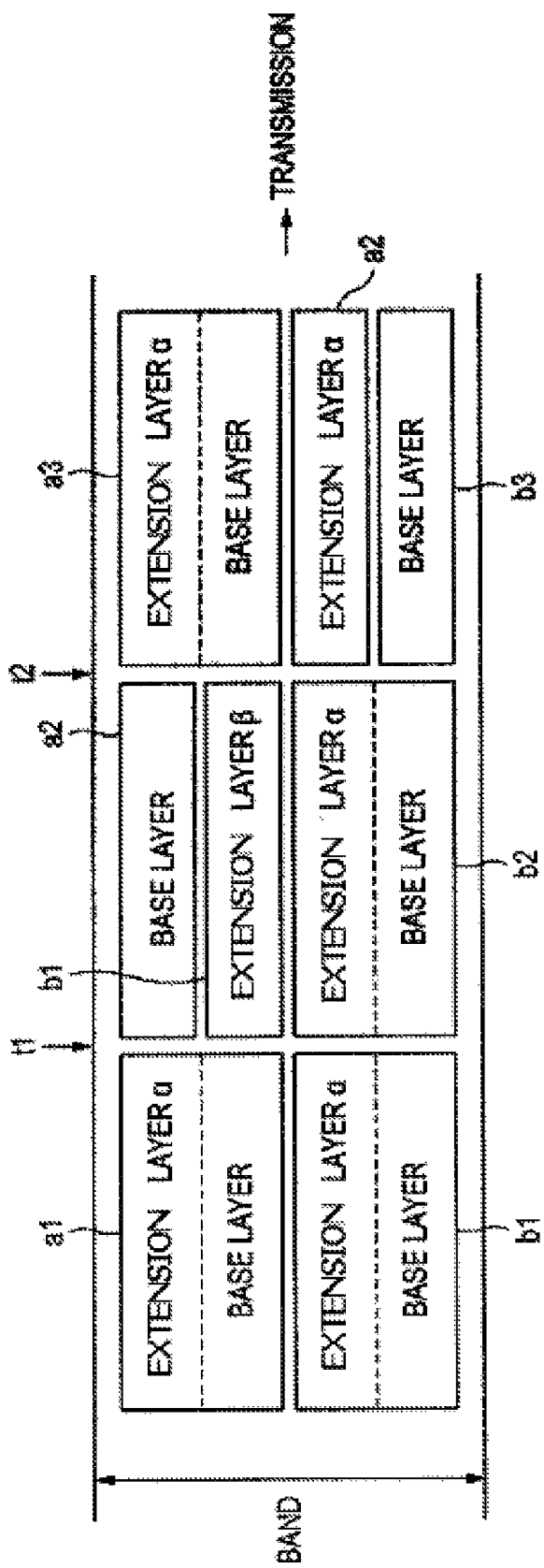
FIG. 4B is a conceptual view showing a bandwidth distribution in the case where the plurality of video streams are transferred according to the embodiment.

FIG. 4A and FIG. 4B are conceptual views showing the case where a plurality of video streams are transmitted within the limited bandwidth (corresponding to four layers).

FIG. 4A shows the scalable encoding structures of the first video stream a and second video stream b, each of which has three layers of the base layer A, extension layer (α) B and extension layer (β) C, like the layer structure shown in FIG. 2.

FIG. 4B is a conceptual view showing an aspect of the scalable transmission of the first video stream a and second video stream b which are scalable-encoded. At normal times, both the video streams a and b are transmitted in the base quality, i.e., the base layer A and the extension layer (α)B, and at least the base layer data a1, a2, a3, . . . , b1, b2, b3, . . . are transmitted in real time.

At time t1, when a transmission of the enhancement quality for the second stream b1 is requested, the first video stream a2 is limited to the base layer A (the lowest quality), and the second video steam b1 is transmitted in the extension layer (β) C. Accordingly, although the first video stream a2 becomes a lowest quality video, the second video stream b1 may be displayed in an enhancement quality.

At time t2, when the transmission of the second video stream b1 of the enhancement quality is ended, the base layer A and extension layer (α) B of the first video stream a3 are transmitted, and the second video stream b3 is limited to the base layer A (the lowest quality), and the extension layer (α) B of the first video stream a2 is transmitted. Accordingly, although the second video stream b3 becomes a lowest quality video, the extension layer (α) B of the first video stream a2 having been limited at the time of t1 may be interpolated, and at least the reception apparatus may perform a rewind replay of the first video stream a2 of the base quality.

Also, although not shown in the drawings in detail, when the first video stream a and second video stream b are transmitted in real time, one of the video streams may be limited to a lowest quality video and the other video stream may be enhanced to an enhancement quality video.

As described above, in the case where a plurality of video streams is simultaneously transmitted, each of the videos is scalable-encoded and one of the video streams decreases in its quality according to a request for the enhancement quality with respect to another video stream, thereby enabling transmission of the enhancement quality data of the other video stream during a designated period of time. In other words, for example, when there is something to focus on when monitoring a plurality of videos, a user may rewind the corresponding video and confirm the video in high quality. At this time, the video not being rewound also needs to be monitored on a real-time screen. The video stream corresponding to the video not being rewound is set to the lowest quality and thus it is possible to confirm the video stream being rewound in a high quality while maintaining the video stream not being rewound to be displayed in a real-time.

Also, in the embodiment described above, a differential video is provided in such a manner that one video reduces its quality thereby enhancing the quality of the other video, and thus a base quality video cannot be obtained during the period of time in which the video is decreased in quality. Therefore, in the case where there is a margin in the bandwidth, the differential video encoded data of the enhancement quality (α) B is transmitted by expending time, and stored in the receiving side memory 153. Accordingly, the reception apparatus 15 may display at least the base quality video.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A video transferring system comprising:
   a transmission apparatus that transmits a video stream as a scalable encoded data including a base layer and a first base quality extension layer in real-time; and
   a reception apparatus that receives the video stream via a network,
   wherein the transmission apparatus comprises:
   a transmitter that transmits, in response to receiving a rewind signal, a second base quality extension layer instead of the first base quality extension layer with the base layer within a limited bandwidth,
   wherein the reception apparatus comprises:

a receiver that receives the video stream and divides the scalable encoded data into each layer;

a memory that stores the real-time transmitted base layer and the first base quality extension layer;

a layer synthesizer that synthesizes the real-time transmitted base layer and first base quality extension layer to create a base quality video signal at normal times, and synthesizes the pre-stored base layer and first base quality extension layer, and the real-time transmitted second base quality extension layer to create a high quality rewind video signal in response to the rewind signal; and a display that displays the created high quality rewind video signal at the same time as displaying the base layer.

2. The system of claim 1 further comprising:

a surveillance camera that records a real-time video signal; and an encoder that encodes the real-time video signal into the base layer, the first base quality extension layer, and the second base quality extension layer.

3. The system of claim 1 wherein the video stream is encoded in H.264/SVC format.

4. The system of claim 1 wherein the base layer comprises the lowest quality video signal, the first base quality extension layer comprises an intermediate quality video signal, and the second base quality extension layer comprises a high quality video signal.

5. The system of claim 1 wherein the display displays the base layer as a real-time video signal.

6. A video reception apparatus that receives a video stream transmitted in real-time as a scalable encoded data including a base layer and a first base quality extension layer via a network, comprising:

a receiver that receives the video stream and divides the scalable encoded data into each layer;

a memory that stores the real-time transmitted base layer and the first base quality extension layer;

a layer synthesizer that synthesizes the real-time transmitted base layer and first base quality extension layer to create a base quality video signal at normal times, and synthesizes the pre-stored base layer and first base quality extension layer, and a real-time transmitted second base quality extension layer instead of the first base quality extension layer with the base layer within a limited bandwidth to create a high quality rewind video signal in response to the rewind signal; and a display that displays the created high quality rewind video signal at the same time as displaying the base layer.

7. The apparatus of claim 6 wherein the video stream is encoded in H.264/SVC format.

8. The apparatus of claim 6 wherein the base layer comprises the lowest quality video signal, the first base quality extension layer comprises an intermediate quality video signal, and the second base quality extension layer comprises a high quality video signal.

9. The apparatus of claim 6 wherein the display displays the base layer as a real-time video signal.

10. A video transferring method comprising:

first transmitting a video stream as a scalable encoded data including a base layer and a first base quality extension layer;

second transmitting, in response to receiving a rewind signal, a second base quality extension layer instead of the first base quality extension layer with the base layer within a limited bandwidth;

receiving the video stream via a network;

dividing the scalable encoded data of the received video stream into each layer;

storing the real-time transmitted base layer and the first base quality extension layer in a memory;

synthesizing the real-time transmitted base layer and first base quality extension layer to create a base quality video signal at normal times, and synthesizes the pre-stored base layer and first base quality extension layer, and the real-time transmitted second base quality extension layer to create a high quality rewind video signal in response to the rewind signal; and displaying the created high quality rewind signal at the same time as displaying the base layer.

11. The method of claim 10 wherein the video stream is encoded in H.264/SVC format.

12. The method of claim 10 wherein the base layer comprises the lowest quality video signal, the first base quality extension layer comprises an intermediate quality video signal, and the second base quality extension layer comprises a high quality video signal.

13. The method of claim 10 wherein the displaying displays the base layer as a real-time video signal.

\* \* \* \* \*